United States Patent Office 3,239,232
Patented Mar. 8, 1966

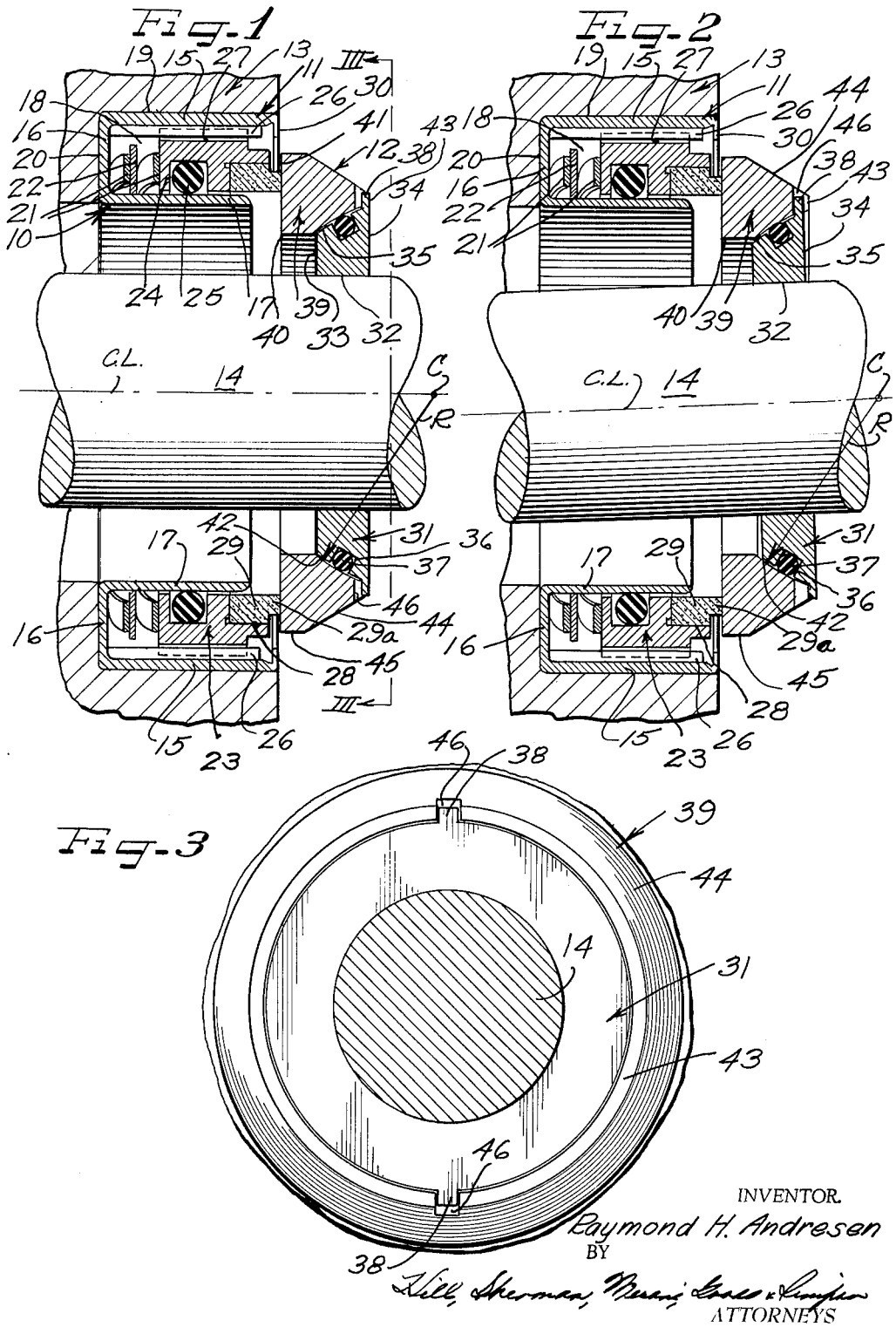

3,239,232
SELF-LEVELING ROTARY SEAL
Raymond H. Andresen, Barrington, Ill., assignor to Gits
Bros. Mfg. Co., Chicago, Ill., a corporation of Illinois
Filed Dec. 20, 1963, Ser. No. 332,102
4 Claims. (Cl. 277—5)

This invention relates to seals of the relatively rotating mating face type which are provided with self-aligning supports to maintain true running mating faces. Specifically the invention deals with a rotary shaft seal having a ball and socket support for the shaft carried mating ring to absorb shaft irregularities without inducing vibrations.

Conventional rotary shaft seals include a spring urged non-rotating seal ring having a nose sealing against and riding on the face of a shaft carried mating ring. The mating ring is fixedly mounted on the shaft for rotation therewith. In some instances the mountings include resilient supports such as rubber rings or metallic membranes. In order to maintain a good seal, the shaft driven mating ring must maintain a true running face in sealing contact against the spring pressed stationary seal ring which is usually composed of carbon. At high shaft speeds, even slight shaft runnouts or deviations from a fixed axis of rotation result in leakage of the seal because the carbon seal ring face is not capable of following the movement of the cocked or wobbling mating ring. It can of course be understood that any deviation of the mating face of the mating ring from a plane which is exactly parallel to the plane of the carbon seal ring nose face will create a wobbling action that will open up gaps between the sealing faces. Further, the use of a resilient mounting for the mating ring on the shaft which might be capable of absorbing shaft irregularities imposes resonant frequencies on the mating ring which cause the contacting faces of the seal ring and mating ring to skip contact and open up leakage paths.

According to the present invention the mating ring of a shaft seal is supported from the shaft on a ball and socket self-levleing joint which will not transmit tilting movements to the mating ring and will not impose resonant frequencies or vibrations to the mating ring.

In accordance with this invention, the mating ring itself is spaced from the shaft and is tiltably mounted on a shaft carried support ring in driving contact therewith. The support ring has a fragmental spherical bearing wall receiving the mating ring therearound in bearing engagement therewith and the coacting walls are struck from a short radius centered on the axial center of the shaft so that any tilting or wobbling of the shaft will not be transmitted to the mating ring. To prevent leakage between the mating ring and its support ring, the support ring preferably has a peripheral groove in which an O-ring seal is embedded for sealingly engaging the mating ring. To insure driving of the mating ring with the support ring the mating ring is equiped with slots receiving tangs on the support ring. This tang and slot driving connection of course does not transmit tilting movements.

It is then an object of this invention to improve the sealing efficiency of shaft seals with an arrangement for leveling the mating face of the mating ring regardless of shaft deviation from a fixed axis of rotation and without imposing resonant frequencies on the mating ring.

Another object of this invention is to provide a ball and socket support for the mating ring of a shaft seal.

A still further object of this invention is to mount the mating ring of a shaft seal through a shaft carried ball member which drives the mating ring from the shaft without transmitting any movements of the shaft from a fixed center of rotation.

A specific object of the invention is to provide a ball and socket support for the mating ring of a shaft seal which also drives the mating ring from the shaft without transmitting tilting movements.

Other and further objects of this invention will be apparent to those skilled in this art from the following detailed description of the annexed sheet of drawings which, by way of a preferred embodiment only, illustrates one example of the invention.

On the drawings:

FIGURE 1 is a longitudinal cross sectional view, with parts in elevation, of a shaft seal according to this invention mounted for operation on a shaft and in a housing.

FIGURE 2 is a view similar to FIG. 1 but illustrating the manner in which the level of the mating face of the mating ring for the seal is maintained even when the shaft is tilted from its running axis.

FIGURE 3 is a transverse cross sectional view along the line III—III of FIG. 1.

As shown on the drawings:

The shaft seal assembly 10 of this invention includes a casing assembly 11 and a mating ring assembly 12. The casing 11 is illustrated as pressfitted in a housing 13 from which projects a shaft 14 on which the mating ring assembly 12 is mounted. The seal 10 is effective to seal the interior of the housing around the projecting shaft.

The casing 11 is a metal ring of U-shaped cross section with an outer cylindrical wall 15, a radial back wall 16 and an inner cylindrical wall 17 each coacting to define a channel 18 opening at the front of the housing 13. The wall 15 is pressfitted into a recess 19 of the housing concentric with the axial center of the shaft 14 and the radial wall 16 of the casing is bottomed against a radial shoulder 20 at the inner end of the recess 19.

The channel 18 of the casing 11 receives a spring assembly bottomed on the back wall 16 and including a pair of wave spring rings 21 separated by a washer 22. A seal carrier ring 23 is slidably mounted in the channel 18 and is bottomed against the spring assembly 21. The carrier ring 23 has an internal groove 24 receiving a rubber O-ring seal 25 which rides on the inner wall 17 of the casing. To hold the carrier ring against rotation relative to the casing, a key or lug 26 is secured on the inner face of the outer peripheral wall 15 and extends axially from the rear wall 16 to the front face of the casing. This key or lug rides in a grooves 27 in the periphery of the carrier ring.

The front face of the carrier ring has a recess 28 receiving a carbon seal ring 29 in pressfit relation. This carbon ring 29 has a nose 29a projecting therefrom to define a sealing face forwardly from the front of the casing.

To hold the assembly in the casing, the open end of the peripheral wall 15 is provided with an inturned flange or lip 30 forming an abutment for the carrier ring 23 limiting the forward travel of the carrier ring.

The shaft 14 has a metal support ring 31 tightly affixed thereto as by pressfitting, clamping, or the like. This ring 31 has a cylindrical inner periphery 32 tightly hugging the shaft 14, a radial front wall 33 and a parallel radial back wall 34. The outer periphery of the ring 31 between the walls 33 and 34 has a fragmental spherical surface 35 struck from a short radius R centered at C slightly ahead of the back wall 34 on the center line CL of rotation of the shaft 14. The spherical wall 34 converges from the back wall 34 to the front wall 33.

The spherical wall 35 has a groove 36 around the central portion thereof receiving a rubber O-ring seal 37.

Diametrically opposed tangs 38 project radially from the surface 35 at the rear wall 34 of the ring.

A metal mating ring 39 is seated on the support ring 31. This mating ring 39 has a cylindrical inner periphery 40 of larger diameter than the shaft 14 so as to be spaced from the shaft. The cylindrical inner periphery 40 extends from a radial front face 41 to a fragmental spherical inner peripheral wall 42 which diverges to a radial back wall 43. The outer periphery 44 of the mating ring tapers radially outward from this back wall 43 to a cylindrical wall 45 adjacent the radial face 41. The spherical inner peripheral wall 42 mates with the wall 35 of the support ring and is struck from the same center and on the same radius as the wall 35. The cylindrical inner periphery 40 of the ring 39 projects axially forward from the support ring 31.

The back wall 43 of the mating ring 39 has a pair of diametrically opposite radial slots 46 receiving the tangs 38. The slots 46 are deeper than the tangs so that tilting movement between the rings 31 and 39 is not impeded but the tangs have radial driving engagement with the sides of the slots to drive the mating ring 39 from the support ring 31.

The O-ring seal 37 sealingly engages the socket wall 42 of the ring 39 but does not interfere with free tilting movements between the mating ring 39 and the support ring 35.

In operation, the nose 29a of the stationary seal ring 29 is pressed against the radial face 41 of the mating ring 39. This mating ring is driven by the shaft 14 through the support ring 31 and sealing contact between the rings 29 and 39 seals the interior of the housing around the entire shaft.

As illustrated in FIG. 2 when the shaft tilts or deviates from the center line CL such tilting movement is not imparted to the mating ring 39 because the support ring 31 will tilt inside of this mating ring 39 and a true running mating face 41 will be maintained for engaging the seal nose 29a. The spring load on the seal nose 29a is is sufficient to hold the mating ring against tilting. Of course the seal ring 37 prevents leakage between the support ring 31 and the mating ring 39 without interfering with tilting of the support ring in the mating ring. Likewise the O-ring 25 seals the carrier 23 in the housing 11 without interfering with the axial movement of the carrier ring to maintain the seal nose 29a in good sealing engagement with the radial face 41 of the mating ring.

Since the support ring 31 and mating ring 39 are composed of rigid material such as metal with the inner periphery 32 of the supporting ring tightly hugging the shaft 14 and the mating socket walls 35 and 42 of the two rings in good bearing engagement, a firm support is maintained for the mating ring 39 and resonant vibrations cannot be built up in this mating ring such as occur in resilient mountings for mating rings. At the same time however any deviation caused by shaft runouts and the like are not transmitted to the mating ring and a true radial sealing face 41 is maintained in a plane normal to the true center line of rotation for the shaft.

The O-ring seal between the seating surfaces 35 and 42 of the support and mating rings may be omitted in some instances and a lapped metal-to-metal fit could be adequate to prevent leakage. Also the support ring 31 could, if desired, be an integral collar or flange on the shaft.

It is preferred that the support surface 35 for the mating ring be struck from a very short radius centered on the true center line of rotation of the shaft to minimize radial and axial shift when the support ring is tilted. A long radius could result in excessive radial movement of the mating ring which could result in an excessively wide running contact between the nose 29a and mating ring face 41 which tends to wipe foreign material under the contacting faces.

From the above descriptions it will be understood that this invention now provides shaft seals which are not influenced by shaft runout conditions or vibrations.

Although various minor modifications might be suggested by those versed in the art, it should be understood that I wish to embody within the scope of the patent granted hereon all such embodiments as reasonably and properly come within the scope of my contribution to the art.

I claim as my invention:

1. In a rotary shaft seal, a support ring having an inner periphery for tightly hugging the shaft and a fragmental spherical outer periphery struck from a short radius centered on the center line of the support ring, a mating ring surrounding said support ring having an inner periphery mating with the outer periphery of the support ring in tiltable relation, a peripheral groove around the support ring, a seal ring in said groove engaging said mating ring, and tang and slot means on the support and mating rings for driving the mating ring from the support ring without transmitting tilting movements therebetween.

2. A mating ring for a shaft seal which comprises a metal ring having a cylindrical internal periphery of substantially larger diameter than a shaft to be received therein, a fragmental spherical socket wall in said mating ring diverging from said cylindrical periphery to the back face of the ring, said mating ring having a radial front face extending from said cylindrical periphery, said back face of the mating ring having radial slots therein, a rigid support ring having a cylindrical inner periphery adapted to snugly hug a shaft in driving engagement therewith, said support ring having a fragmental spherical outer periphery mating with the socket of said mating ring, tangs on said support ring extending into said slots of the mating ring, and seal means between the mating ring and support ring accommodating free tilting of the support ring in the mating ring without permitting leakage therebetween.

3. A shaft seal which comprises first and second seal rings arranged to encircle the shaft and having flat radial faces in sealing engagement, spring means urging one of the seal rings axially toward the other seal ring to maintain said radial faces of the two rings in sealing contact, one of said seal rings having a fragmental spherical inner periphery struck from a short radius centered at the center of rotation of the shaft, a support ring having a fragmental spherical outer periphery mating with said fragmental spherical inner periphery of said seal ring and struck from the same radius on the same center line, seal means interposed between the mating fragmental spherical surfaces to prevent leakage between the support ring and the seal ring supported thereon, key and keyway means on the support ring and seal ring supported thereon holding the rings against relative rotation while a accommodating relative tilting of the rings, one of said seal rings being rotatable, the other of said seal rings being stationary, and said short radius of the fragmental spherical surfaces of the support ring and ring supported thereon minimizing radial and axial shifts of the seal ring on the support ring during relative tilting of the ring and thereby minimizing the wiping of foreign material under the contacting radial sealing faces.

4. In a rotary shaft seal, a shaft, means carried by the shaft having a fragmental spherical outer periphery struck from a short radius centered on the center line of the shaft, a mating ring surrounding said means having an inner periphery mating with the outer periphery of said means in tiltable sealed relation therewith, and key and slot means on the means carried by the shaft and on the mating ring acting therebetween independently of the shaft for driving the mating ring with the shaft without transmitting tilting movements of the shaft to the mating ring.

References Cited by the Examiner

UNITED STATES PATENTS 2,299,395  10/1942  Karlberg _____ 277—81 X
2,860,895  11/1958  Mosbacher _____ 277—3
2,966,374  12/1960  Jensen _____ 277—38

SAMUEL ROTHBERG, *Primary Examiner.*